Oct. 30, 1962 J. E. BOYER 3,060,497
PLASTIC CONTAINER TAKE-OUT DEVICE
Filed Dec. 15, 1960 4 Sheets-Sheet 1
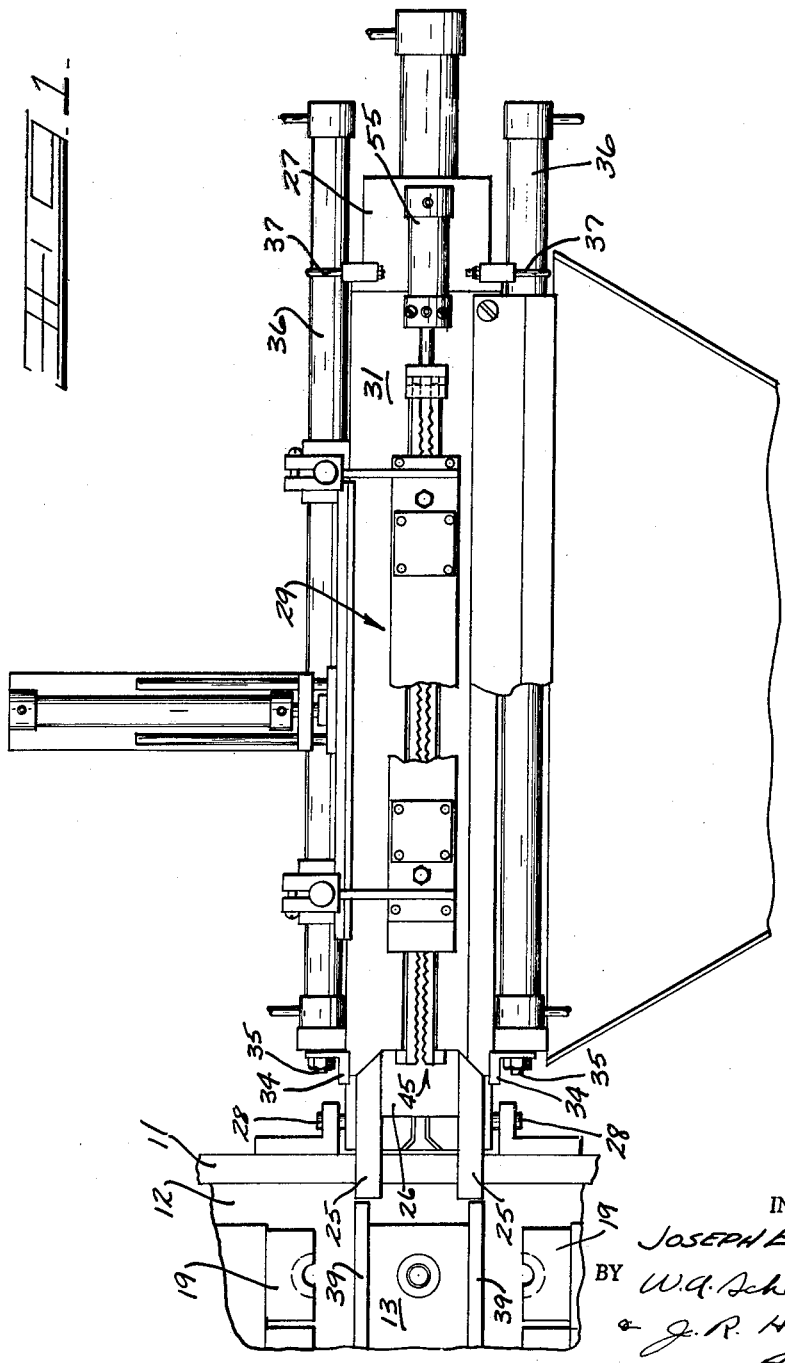
INVENTOR.
JOSEPH E. BOYER
BY W. G. Schaich
& J. R. Hoge
ATTORNEYS

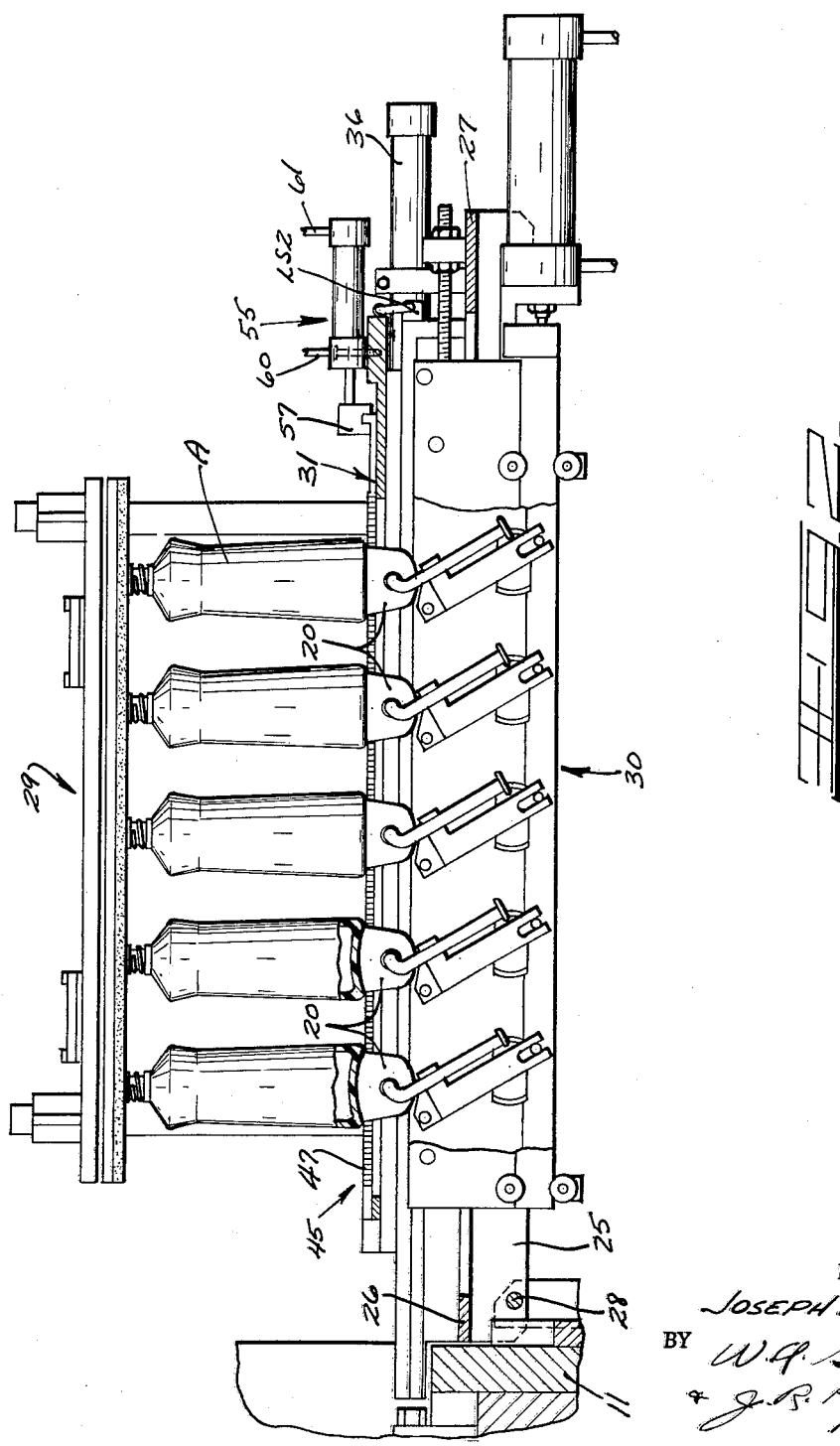

Oct. 30, 1962 J. E. BOYER 3,060,497
PLASTIC CONTAINER TAKE-OUT DEVICE
Filed Dec. 15, 1960 4 Sheets-Sheet 3
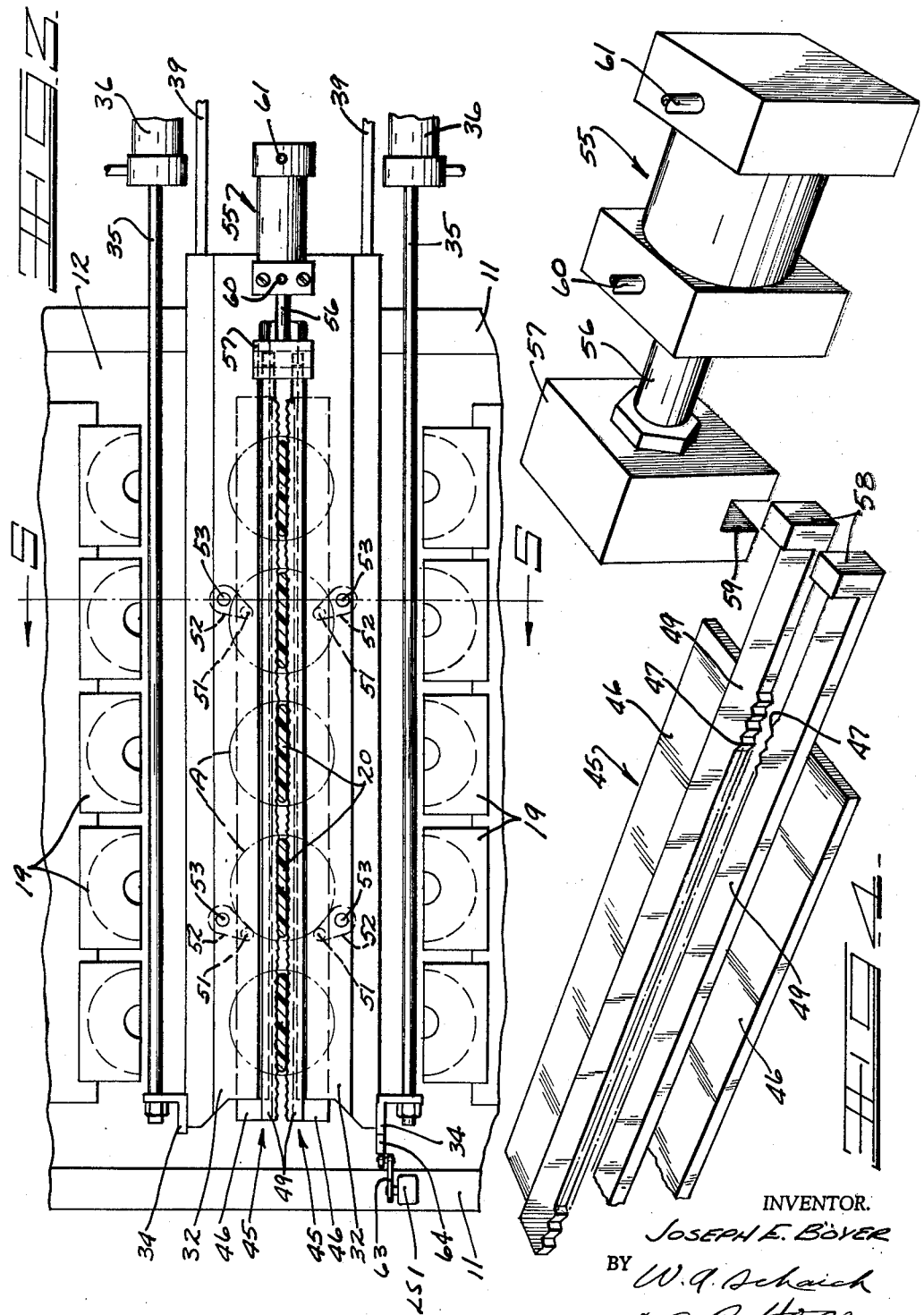
INVENTOR.
JOSEPH E. BOYER
BY Oct. 30, 1962 J. E. BOYER 3,060,497
PLASTIC CONTAINER TAKE-OUT DEVICE
Filed Dec. 15, 1960 4 Sheets-Sheet 4
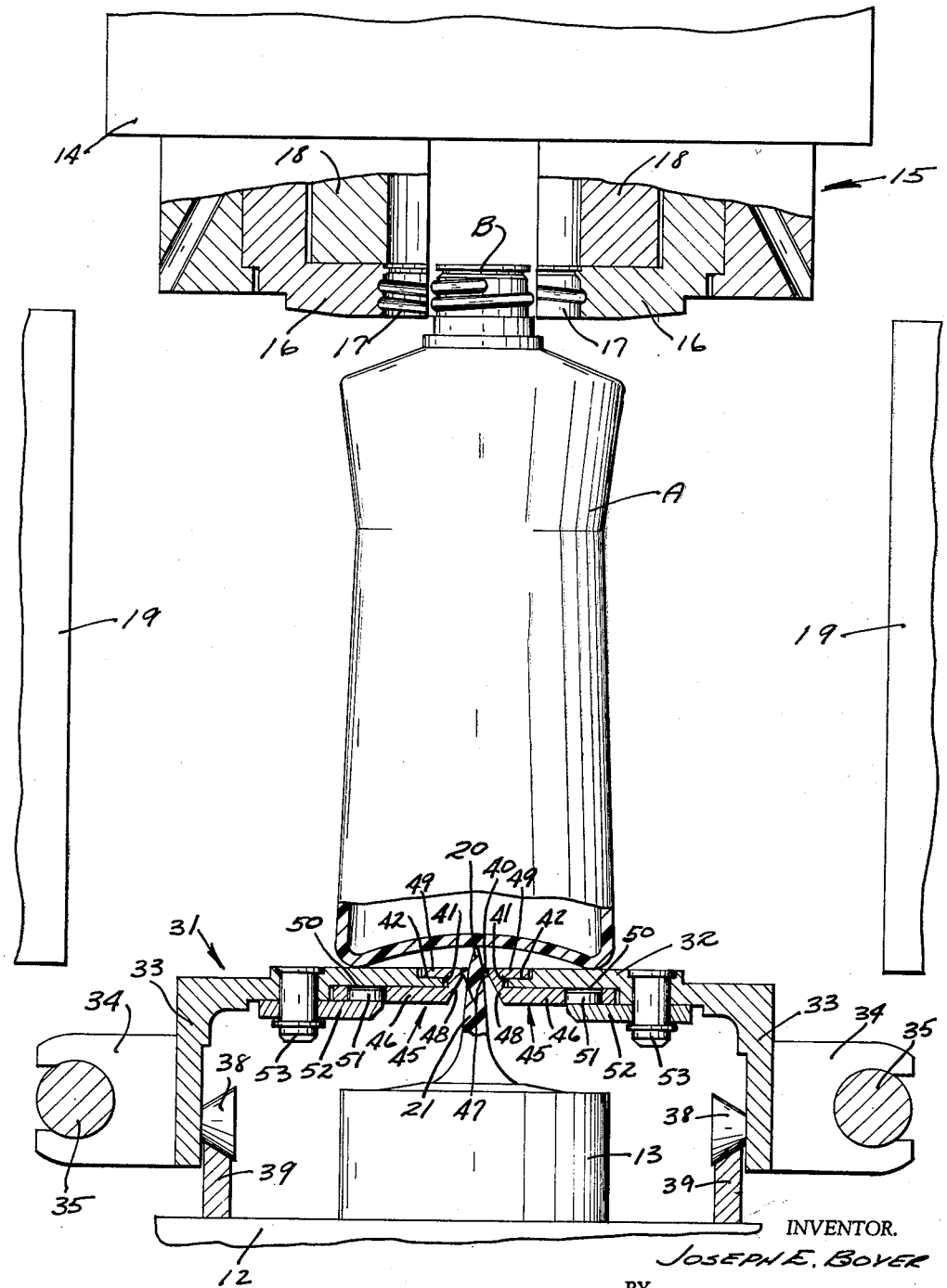
INVENTOR.
JOSEPH E. BOYER
BY W.G. Schauch
J.R. Hoge
ATTORNEYS

United States Patent Office 3,060,497
Patented Oct. 30, 1962

1

3,060,497
PLASTIC CONTAINER TAKE-OUT DEVICE
Joseph E. Boyer, Toledo, Ohio, assignor to Owens-Illinois Glass Company, a corporation of Ohio
Filed Dec. 15, 1960, Ser. No. 76,037
3 Claims. (Cl. 18—2)

The present invention relates to a take-out device and more particularly to a device for removing a plastic article from a plastic forming machine.

The present invention constitutes an improvement of the take-out mechanism disclosed in the copending application of Leon E. Elphee, Serial No. 39,855, filed in the United States Patent Office on June 30, 1960, assigned to the assignee of the present invention and now abandoned.

The take-out of this earlier application, as is the take-out of the present invention, is particularly adapted for utilization in conjunction with a plastic forming machine of the type illustrated in the copending application of Richard C. Allen and Leon E. Elphee, Serial No. 797,276, filed March 4, 1959, now Patent No. 3,008,192 and also assigned to the assignee of the present invention.

Generally, the take-out of the present invention is structurally and functionally similar to that of the earlier filed Elphee application in that it discloses the removal of one or more formed articles from a forming machine in which the article is retained by its connection, through a waste portion, to a portion of the forming machine, such as an orifice or the like. Thus, the take-out includes a longitudinally displaceable supporting plate which is movable from a retracted position exterior to the forming machine to an inserted position at which the plate contacts the formed articles to support the articles in an upright position. The plate is provided with a slot through which the waste portions or "tails" of the formed articles project, and gripping means are actuated after insertion of the plate to engage the waste portions and to secure the waste portions, and the articles adhered thereto, to the plate for co-movement during retraction. After retraction of the plate and the articles surmounting the plate, the gripping means are released, the articles are retained on the plate by a "hold-down" mechanism, and the waste portions are engaged and removed by a "tail-removal" mechanism.

The present invention resides primarily in the provision of an improved, simplified, more positively acting gripping mechanism for insuring co-movement of the plate and the articles during the extraction of the articles from the forming machine. The earlier filed Elphee application discloses a rather complicated, externally actuated cam and spring arrangement for engaging the waste portions or tails of the formed articles to insure their co-movement with the take-out plate.

The present invention substitutes therefor a simplified gripper mechanism consisting generally of a pair of parallel, spaced gripping elements between which the waste portion or tail of the article is inserted and a power means for moving the gripping element into and out of engagement with the tail. The gripping elements are pivoted to the plate through spaced pivot links; the links, the plate and the individual gripping members forming quadratic linkages to insure parallel movement of the gripping elements into and out of engagement with the tails therebetween.

It is, therefore, an important object of the present invention to provide a new and improved take-out mechanism for a plastic forming machine.

Another important object of the present invention is the provision of an improved take-out mechanism for a plastic forming machine having positively acting gripping elements engageable with a waste portion of the article prior to its removal from the machine.

2

It is a further important object of this invention to provide a new and improved gripping mechanism for a take-out mechanism and including a pair of movable gripping plates engageable with waste portions of articles retained by a portion of a plastic forming machine and positively acting power means for moving the gripping elements into and out of engagement with the waste portions.

Other objects of this invention will appear in the following description and appended claims, reference being had to the accompanying drawings forming a part of this specification wherein like reference characters designate corresponding parts in the several views.

On the drawings:

FIGURE 1 is a plan view of a take-out device of the present invention;

FIGURE 2 is a side elevational view of the device, with parts broken away and in section;

FIGURE 3 is a fragmentary plan view, with parts broken away and in section, illustrating the device in use;

FIGURE 4 is an enlarged exploded perspective view of the article gripping means and the power means therefor;

FIGURE 5 is a vertical sectional view taken along the plane 5—5 of FIGURE 3.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As shown on the drawings:

As above explained, the take-out of the present invention is generally quite similar to that disclosed in the above-identified sole application of Leon E. Elphee, while the forming machine with which the take-out mechanism is utilized is substantially the same as that disclosed in the above-identified application of Richard C. Allen and Leon E. Elphee, Serial No. 797,276.

The forming machine comprises upstanding or vertical support members 11 (FIGURES 1, 2 and 3) between which is supported an orifice plate 12 having a plurality of upstanding orifice blocks 13 in longitudinal alignment. These orifice blocks 13 are provided with vertical bores (not shown) communicating with a source of plasticized plastic material. Also carried by the forming machine frame element 11 is an upper neck mold block 14 adapted for vertical movement toward and away from the orifice blocks 13. Depending from the neck mold block 14 are a plurality of individual neck mold assemblies 15, one such assembly being provided for each orifice block. The neck mold assemblies each include a pair of split neck mold halves 16 separable, as shown in FIGURE 5, to release the formed neck B of a formed article A and cooperable, when closed, to define a neck mold cavity 17 alignable with the orifices 13, respectively, and within which the neck B is formed. The neck mold spaces 17 are closed by upper split cylindrical neck mold sleeves 18 which are movable laterally for separation with the neck mold halves 16.

Briefly, the plastic article forming process includes the initial step of positioning the closed neck mold halves over the orifice blocks 13 and in alignment therewith to receive plastic material from the orifice blocks, the neck mold spaces being closed by the upper neck mold sleeve halves 18. Upon the issuance of plastic material from the orifice blocks into the neck mold cavities 17, a portion of the plastic article, such as the container finish or neck B is injection molded within the mold spaces 17.

After the injection molding steps of the process are completed, the neck mold block 14 is moved vertically upwardly while the neck mold halves 16 are maintained closed. Simultaneous with such movement of the block 14, there is extruded from the orifices of the blocks 13 a tubular formation of plastic integral with the injection molded portion B of the article A, this tubular formation being joined to the material filling the neck mold cavities 17 and also to material still within the extrusion orifice blocks 13. After extrusion of the tube is completed, complementary blow mold sections 19 are closed on the tube to enclose the major portion of the tubular formation intermediate the neck molds 15 and the orifice blocks 13.

Next, air is introduced into the enclosed portion of the tube and the body of the article A is blown to its final configuration. After blowing of the article, the blow mold halves 19 are opened and the article A suspended between the neck molds 15 and the orifice blocks 13 are exposed.

Closure of the blow molds 19, before the blowing step, pinches the tube shut, as at 20, to form a closed plastic bubble communicating with the source of blow air through the injection molded portion B thereof. Since closure of the blow mold sections 19 on the tube does not completely sever the tube, but merely pinches the tube shut, the tube during blowing remains attached to the orifices of the blocks 13 through a waste portion or tail 21. This waste portion 21 continues to join the finished article A to the orifice blocks 13 and, obviously, the tail 21 must be severed from the article A before the article A is a finished article of commerce.

The take-out device of the present invention comprises a pair of angle iron main frame elements 25 joined adjacent their front extremities by a transverse frame member 26 and adjacent their rear extremities by transverse frame members 27 to form a rectangular supporting frame secured to the machine frame element 11 by suitable means, as by transverse pivot pins 28 (FIGURE 2).

The resultant rigid rectangular frame carries an upper "hold-down" assembly 29 and lower "tail removal" units indicated generally at 30. The "hold-down" assembly and the "tail removal" units are described in detail in the above-identified sole application of Leon E. Elphee and form no part of the present invention. Thus, these elements need not be described in detail herein.

The rigid rectangular frame defined by the members 25, 26 and 27 also supports for longitudinal displacement thereon an upper article support plate 31 best illustrated in FIGURE 5 of the drawings. This article support plate 31 is of inverted U-shape and includes an upper web or support portion 32 joined integrally to depending leg portions 33. These leg portions 33 carry laterally outwardly projecting brackets 34 connecting the plate 31 to the piston rods 35 of the elongated fluid actuated cylinders 36. The cylinders 36 are anchored, as by U-bolts 37, respectively, to the frame elements 25 and serve to displace the support plate assembly 31 longitudinally of the frame.

As disclosed in the above-identified Elphee application, such longitudinal displacement of the plate 31 is accommodated by cooperating guide surfaces formed on the frame and the plate, respectively. Also, the depending legs 33 of the plate assembly 31 are provided with inwardly projecting tapered guide rollers 38 contacting upstanding, transversely spaced guide rails 39 carried by the orifice plate 12 and projecting thereabove in longitudinal parallelism with the row of aligned orifice blocks 13.

As perhaps best shown in FIGURE 5 of the drawings, the support plate 31 is provided with a longitudinally extending slot 40 open at its forward end and defined by vertical edges 41. Adjacent the edges 41, the upper surface of the plate 32 is recessed, as at 42. Carried by the plate for both longitudinal and transverse sliding movement are a pair of cooperating gripper elements, indicated generally at 45, and each comprising a lower planar portion 46 slidingly engaging the undersurface of the plate 32, serrated vertical gripping edges 47 joined through lower chamfered surfaces 48 to the lower portions 46, and inturned upper guiding portions 49 slidably engaging the upper surfaces of recesses 42 adjacent the plate slot 40.

The lower portions 46 of the gripping elements 45 are provided with vertical apertures 50 receiving therein upstanding studs 51 formed on or secured to pivot links 52, which are pivotally connected to the plate 31 by vertically extending pivot pins 53. It will be seen from FIGURE 3 that four such pivot links 52 are provided, the links being movable rotatably about the vertical pivot pins 53 and being connected rotationally, through studs 51, to the gripper elements 45 to effect movement of the elements toward and away from one another.

Thus, the support plate 31, the pivot links 32 and the gripping element 45 define quadratic linkages supporting each of the gripper elements 45 for transverse movement in parallel planes to bring the serrated gripping edges 47 into and out of engagement with the waste portions 21 adhered to the article A at their upper ends and adhered to material within the orifice blocks 13 at their lower ends.

The gripping members 45 are reciprocated by suitable power means, such as a fluid pressure actuated cylinder 55 secured to the plate 31 and displaceable therewith upon actuation of the cylinders 36. This fluid pressure actuated cylinder 55 has its piston rod 56 connected through block 57 to the gripping members 45 by means of upstanding abutments 58 formed in or secured to the rear ends of the gripping members and slidably received within a transverse slot 59 formed in the undersurface of the block 57. Thus, upon actuation of the cylinder 55, the piston rod 56 will be reciprocated and will reciprocate the gripping members.

Because of the pivot links 52, the gripping members 45 will be moved arcuately about the axes of the pivot pins 53 and will move transversely as well as longitudinally. More specifically, retraction of the piston rod 56, as upon the introduction of fluid under pressure from a suitable source through conduit 60 into the cylinder, will cause the gripping members to be moved to the right (as illustrated in FIGURE 3) and the links 52 will cause the gripping member serrated edges 47 to move toward one another and into engagement with the waste portions 21, assuming that the plate 31 has been extended to overlie the orifices 13. Similarly, actuation of the cylinder 55 to extend the rod 56, as by the introduction of fluid under pressure through the conduit 61 into the cylinder 55, will cause the gripping edges 47 to be separated.

To correlate the operation of the gripping members with the remainder of the apparatus, a limit switch LS1 is mounted on one of the vertical frame elements 11 of the plastic article forming machine, the limit switch actuating arm 63 being contacted by an adjustable projection 64 carried by the plate 31 upon full insertion of the take-out to a position at which the gripping surfaces 47 straddle the waste portions 21 still attached to the plurality of orifices in the blocks 13, respectively. Upon actuation of the limit switch arm 63, the neck mold assemblies 15 are opened releasing the containers A from the forming mechanism for retraction with the take-out mechanism.

A second limit switch LS2, functioning as a safety device to insure full retraction of the take-out mechanism prior to other machine operations, is carried by one of the frame elements 25 and is positioned to be contacted by the plate 31 when the same is fully retracted to introduce fluid under pressure into the cylinder 55 through the conduit 61 to thereby extend the piston rod 56.

The actuation of the gripping elements by the cylinder 55 is under the control of a timer mechanism (not shown). The use of a timer makes possible the opening and closing of the gripping members at any time and in any desired correlation with other machine operations without extensive shifting of limit switches or the like.

As explained in detail in the above-identified Elphee application, Serial No. 39,855, the hold-down assembly 29 and the tail removal units 30 are subsequently actuated to effect removal of the tails 21.

Having thus described my invention, I claim:

1. In a take-out device for removing a plurality of aligned plastic articles from a molding apparatus, each of the articles being retained in the apparatus by a waste portion at one end thereof joined to fluid material filling an adjacent orifice, respectively, including a reciprocable take-out element movable between a first position adjacent the aligned articles retained in the apparatus and a second position exterior to the apparatus, and power means for reciprocating said take-out element to and from said positions, the improvements of a pair of spaced gripping elements carried by said take-out element for reciprocation therewith, spaced pivot links interconnecting each of said gripping elements and said take-out element for relative movement, a fluid pressure actuated cylinder carried by said take-out element and having its piston rod connected to said gripping elements to actuate the same into and out of engagement with the waste portions of said articles, and separate control valve means at said first position and said second position, respectively, for actuating said cylinder to reciprocate said gripping elements.

2. In an apparatus for removing a formed plastic article from a molding apparatus in which the article is restrained by a waste portion joined to fluid material in an orifice, including a reciprocable plate insertable into the forming machine and having an elongated open-ended slot receiving the waste portion therein, the improvements of transversely spaced gripping members carried by the plate to either side of said slot, respectively, for straddling the waste portion upon the insertion of the plate in the machine, a pair of spaced parallel links joining each of said members to said plate, respectively, said members being relatively laterally movable in parallelism, as guided by said links, a fluid pressure actuated cylinder carried by said plate for movement therewith and extensible and retractable relative to the plate in a plane parallel to the plane of reciprocation of the plate, and means interconnecting said cylinder and said members for joint longitudinal displacement relative to said plate, said last-named means accommodating relative lateral movement of said members as guided by said links.

3. In an apparatus for removing a formed plastic article from a molding apparatus in which the article is restrained by a waste portion joined to fluid material in an orifice, said apparatus including a reciprocating plate insertable into the forming machine and having an elongated open-ended slot receiving the waste portion therein and spaced gripping elements carried by the plate and straddling the waste portion upon the insertion of the plate in the machine, the improvements of means for actuating said gripping elements into engagement with the waste portion, including a pivotal linkage interconnecting said gripping elements and said plate, respectively, and guiding said elements for relative transverse movement upon their joint longitudinal displacement relative to the plate, power means carried by said plate, and a longitudinally reciprocable coupling means joining the power means to said elements, said coupling means accommodating relative transverse movement of said elements during their joint longitudinal displacement by said power means.

No references cited.